Oct. 11, 1927.
J. S. SANTIAGO
1,645,454
DIRECTION INDICATOR FOR VEHICLES
Original Filed Oct. 14, 1925
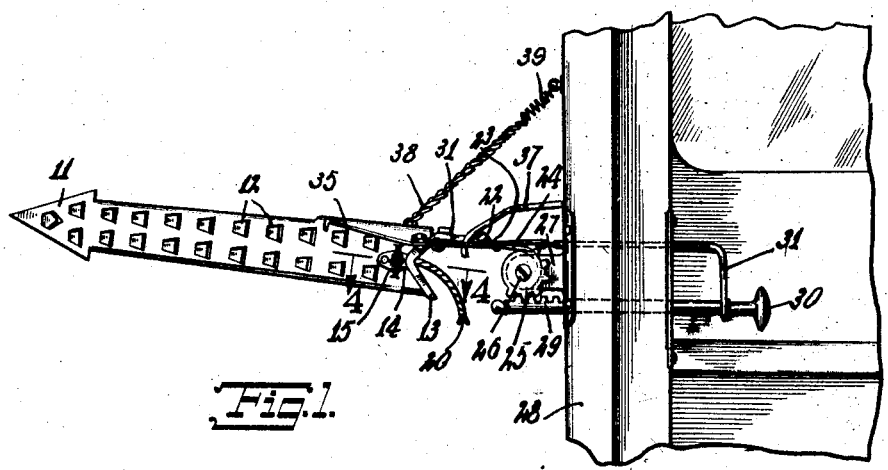
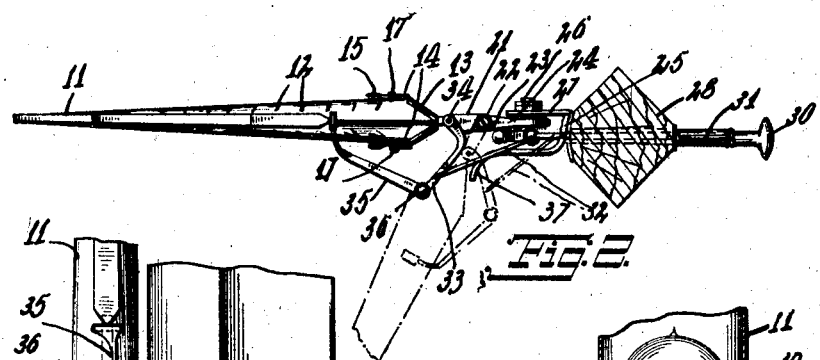
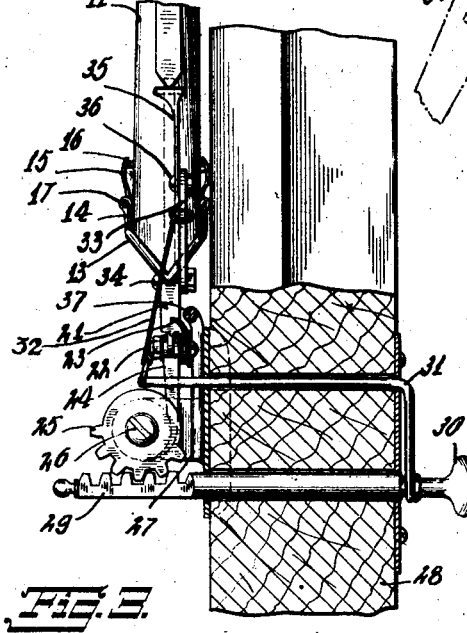
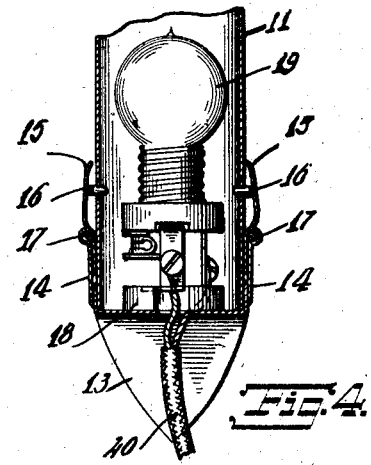
INVENTOR.
Juan Sierra Santiago
BY
ATTORNEY Patented Oct. 11, 1927.

1,645,454

UNITED STATES PATENT OFFICE.

JUAN SIERRA SANTIAGO, OF SAN JUAN, PORTO RICO.

DIRECTION INDICATOR FOR VEHICLES.

Application filed October 14, 1925, Serial No. 62,364. Renewed August 17, 1927.

This invention relates to direction indicators, and more particularly to indicators for use on motor vehicles.

One of the pincipal objects of the invention is to provide a simple appliance of this character having a novel illuminated signal member controlled from a convenient place within the vehicle near the driver of said vehicle.

The device eliminates the necessity of a vehicle driver extending his hand from the vehicle, and a further object is to provide an outward motion while the downward motion of the signal member is in progress, and after giving the signal, the signal member resumes its normal position.

Another object of the invention consists in the novel construction and arrangement of parts, and further objects will appear as the following description is read in connection with the accompanying drawings, which forms a part of this application, and in which :—

Fig. 1 shows a side elevation of the device in a lowered position with the signal member extended.

Fig. 2 shows a plan elevation of Figure 1 with horizontal support chain and outward control wire eliminated. The dot and dash lines in the figure indicate the natural position of the signal member in the downward position.

Fig. 3 shows an enlarged fragmentary partly sectional view of lower part of the device, with signal member in an upright position.

Fig. 4 shows a fragmentary partly sectional view on the line 4—4 of Figure 1.

Signal member 11 has a multiple of apertures formed by depressing tongues 12 out of the surface of said signal member, and is provided with a back cover 13 which is removably held by clamping device consisting of parts 14 fastened to said back cover, movable clamps 15 provided with pins 16 to fit into holes in said signal member, pivoted by pintle pins, 17, and rigidly mounted on said back cover is an electric bulb socket 18, an electric lamp 19 provided to illuminate with red rays, and a flexible lead 20.

During the daytime signal member may be used with the electric lamp turned off, but at night or in cloudy weather, it is advisable to illuminate the signal member by having the lamp turned on thereby allowing red rays out of apertures in said signal member reflected by tongues 12.

The signal member normally is in an upright position, and to signal this member descends downward and laterally, or in other words the signal member has a simultaneous lateral horizontal motion and a vertical motion. Lever member 21 extends into the back of signal member and supports same, is pivoted at its other end by pintle bolt 22, and is maintained in an outright position by the action of a coil spring 23, acting against lever extension member 24 which is rigidly fastened onto the hub of pinion 25 and is pivotally supported by pintle bolt 26 to support bracket 27 fastened to a convenient part 28 of vehicle to which invention is attached. Said pinion 25 has only enough teeth to provide for about a 90° swing engaged by rack 29 having a control handle 30 projecting through part 28 to a convenient place for manual operation by vehicle driver. The parts functioning in the upward and downward motion have now been reviewed, but there is a simultaneous outward lateral horizontal motion also. An auxiliary control rod 31 rigidly fastened to control handle 30 has at its outer end a flexible wire 32 fastened thereto, and connected with lever 33 having one end pivoted by pintle bolt 34 to lever member 21 and the other end to lever 35 by pintle bolt 36 said lever 35 has its further end pivotally mounted on the end of lever member 21, and a guide 37 is rigidly fastened to support bracket 27, so that signal member is drawn outwardly or laterally against this guide at the same time it is descending because as member 30 is drawn inwards, the motion is communicated to 31, thereafter to the flexible wire 32, which being connected to lever 33 draws this member from the position shown in full lines in Fig. 2 to that shown in dotted lines. A chain 38 with a spring 39 to allow a little elasticity acts as a horizontal stop for signal member.

The device is operated by drawing control handle 30 out to obtain the downward and outward motion, and pressing handle 30 in, to return to upward an inward position. Coil spring 23 returns signal member inward to its normal position.

While I have illustrated and described my invention with some degree of particularity, I realize that in practice various alterations therein may be made. I therefore reserve the right and privilege of changing the form of the details of construction or otherwise altering the arrangement of the co-related parts without departing from the spirit or scope of the appended claims.

Having thus described my invention, what I claim as new, and desire to secure by Letters Patent of the United States is as follows:—

1. A device of the class described, comprising a signal member, a lever carrying said signal member pivoted to an extension member, a pinion with said extension member rigidly fastened to the pinion hub, a rack engaging said pinion and having a control handle, an auxiliary control rod rigidly fastened to said control handle, a flexible connection between end of said control rod and a lever pivotally attached another lever with outer ends of both levers pivotally attached to the lever carrying said signal member, a guide and a normal position coil spring.

2. A device of the class described, comprising a signal member, a lever carrying said signal member pivoted to an extension member, a pinion with said extension member rigidly fastened to the pinion hub, a rack engaging said pinion and having a control handle, an auxiliary control rod rigidly fastened to said control handle, a flexible connection between end of said control rod and a lever pivotally attached another lever with outer ends of both levers pivotally attached to the lever carrying said signal member, a guide, and a normal position coil spring, whereby when pulling control handle out the signal member descends outwardly, and pressing control member in vice versa occurs.

3. A device of the class described, comprising a signal member carried by a lever pivoted to an extension lever, and a spring acting against both of said levers maintaining a straight position, said extension lever being carried on the hub of a pinion rotatably supported, said pinion being engaged by a rack controlled by a control handle having an auxiliary control rod rigidly attached, and a flexible connection at the end of said auxiliary control rod connecting to a lever pivotally attached to another lever with the outer ends of both levers pivotally attached to the lever carrying said signal member, and a guide against which said signal member acts when descending and ascending.

4. A device of the class described, comprising a signal member carried by a lever pivoted to an extension lever, and a spring acting against both of said levers maintaining a straight position, said extension lever being carried on the hub of a pinion rotatably supported, a chain and spring attached to said signal member and a support allowing said signal member to descend to only a horizontal position, said pinion being engaged by a rack controlled by a control handle having an auxiliary control rod rigidly attached, and a flexible connection at the end of said auxiliary control rod connecting to a lever pivotally attached to another lever with the outer ends of both levers pivotally attached to the lever carrying said signal member, and a guide against which said signal member acts when descending and ascending.

In testimony whereof I have affixed my signature.

JUAN SIERRA SANTIAGO.